US011582822B2

United States Patent
Huang et al.

(10) Patent No.: US 11,582,822 B2
(45) Date of Patent: Feb. 14, 2023

(54) APPARATUSES AND METHODS FOR COORDINATING OPERATIONS ASSOCIATED WITH MULTIPLE SUBSCRIBER IDENTITIES

(71) Applicant: MEDIATEK INC., Hsinchu (TW)

(72) Inventors: Yu-Hua Huang, Hsinchu (TW); Chin-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/662,177

(22) Filed: Oct. 24, 2019

(65) Prior Publication Data

US 2021/0127443 A1    Apr. 29, 2021

(51) Int. Cl.
*H04W 60/00* (2009.01)
*H04W 76/16* (2018.01)
*H04W 80/08* (2009.01)
*H04W 8/20* (2009.01)
*H04W 76/27* (2018.01)

(52) U.S. Cl.
CPC ............ *H04W 76/16* (2018.02); *H04W 8/20* (2013.01); *H04W 76/27* (2018.02); *H04W 80/08* (2013.01)

(58) Field of Classification Search
CPC ..... H04L 43/0811; H04L 45/24; H04L 69/14; H04W 88/06; H04W 76/27; H04W 8/26; H04W 76/16; H04W 36/0066; H04W 76/18; H04W 76/10; H04W 36/0069
See application file for complete search history.

(56) References Cited

U.S. PATENT DOCUMENTS

| 2004/0213174 | A1* | 10/2004 | Engels | H04L 1/0003 370/347 |
| 2015/0092613 | A1* | 4/2015 | Yerrabommanahalli | H04M 3/42042 370/259 |
| 2016/0337390 | A1* | 11/2016 | Sridhara | H04W 12/1208 |
| 2018/0132289 | A1* | 5/2018 | Zhao | H04W 48/10 |

FOREIGN PATENT DOCUMENTS

| CN | 102395207 A | * | 3/2012 |
| CN | 102395207 A | * | 3/2012 |
| TW | 201547311 A |   | 12/2015 |

OTHER PUBLICATIONS

Chinese Language Office Action dated Apr. 30, 2021 of its corresponding Taiwan patent application No. 109136643.

* cited by examiner

*Primary Examiner* — Gary Lafontant
(74) *Attorney, Agent, or Firm* — McClure, Qualey & Rodack, LLP

(57) ABSTRACT

A mobile communication device including a Radio Frequency (RF) device and a controller is provided. The controller activates a predetermine Application (APP), and provides a Packet-Switched (PS) data service for the predetermined APP using a first subscriber identity via the RF device. Also, the controller establishes a Radio Resource Control (RRC) connection using a second subscriber identity via the RF device to enable the mobile communication device to enter an RRC connected mode after the predetermined APP is activated, and keeps the mobile communication device in the RRC connected mode associated with the second subscriber identity while providing the PS data service for the predetermined APP using the first subscriber identity.

14 Claims, 4 Drawing Sheets

APPARATUSES AND METHODS FOR COORDINATING OPERATIONS ASSOCIATED WITH MULTIPLE SUBSCRIBER IDENTITIES

BACKGROUND OF THE APPLICATION

Field of the Application

The application generally relates to wireless communications, and more particularly, to apparatuses and methods for coordinating operations associated with multiple subscriber identities.

Description of the Related Art

With the growing demand for ubiquitous computing and networking, various Radio Access Technologies (RATs) have been developed, such as Global System for Mobile communications (GSM) technology, General Packet Radio Service (GPRS) technology, Enhanced Data rates for Global Evolution (EDGE) technology, Universal Mobile Telecommunications System (UMTS) technology, Interim Standard 95 (IS-95) technology, Code Division Multiple Access 2000 (CDMA-2000) technology, CDMA-2000 1× Evolution-Data Optimized or Evolution-Data (CDMA-2000 1× EV-DO) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, New Radio (NR) technology, and others. In particular, GSM/GPRS/EDGE technology is also called 2G cellular technology; WCDMA/CDMA-2000/TD-SCDMA technology is also called 3G cellular technology; LTE/LTE-A/TD-LTE technology is also called 4G cellular technology; and NR technology is also called 5G cellular technology.

Generally, a cellular phone (which may also be referred to as a User Equipment (UE) or Mobile Station (MS)) only supports one RAT and provides the user with flexible mobile communications at all times via the supported RAT using a single subscriber identity card (which provides a single subscriber identity). However, to an increasing extent, more and more people find that having an additional subscriber identity card (which provides an additional subscriber identity) is a good way to reduce their mobile service charges (including voice and/or data services), or to separate personal and business phone calls. In order to alleviate the burden of carrying two cellular phones for two separate subscriber identity cards, so-called dual-card cellular phones have been developed, which generally support one or more RATs for respective mobile services using an individual subscriber identity card. The dual-card design allows calls to be made or received on either subscriber identity amid other mobile services.

Most dual-card cellular phones are generally equipped with a single Radio Frequency (RF) device to keep costs low. Due to a single RF device being shared by the transmission/reception operations associated with two separate subscriber identities, only one subscriber identity is allowed to occupy the single RF device for transmission/reception operations at any given time. For most conventional designs of a dual-card cellular phone, if a call request for one subscriber identity is received during an ongoing data service associated with the other subscriber identity, the data service will be stopped to give away the access to the RF device, so that the call associated with the subscriber identity may be made.

However, in many cases, the importance of certain data services may be valued more than that of call services. Consequently, allowing the call service associated with one subscriber identity to preempt the ongoing data service associated with the other subscriber identity may result in poor user experience on dual-card cellular phones.

BRIEF SUMMARY OF THE APPLICATION

In order to solve the aforementioned problem, the present application proposes to allow the data service for one subscriber identity to continue until a user input to accept the call service for the other subscriber identity is received, thereby keeping the data service going smoothly as long as possible. By contrast, in the conventional designs, the data service is suspended as soon as a paging of an incoming call is received, even though the user has not yet been informed of the incoming call and not yet decided whether to accept or reject the call.

In one aspect of the application, a mobile communication device comprising a Radio Frequency (RF) device and a controller is provided. The controller is configured to activate a predetermine Application (APP), provide a Packet-Switched (PS) data service for the predetermined APP using a first subscriber identity via the RF device, establish a Radio Resource Control (RRC) connection using a second subscriber identity via the RF device to enable the mobile communication device to enter an RRC connected mode after the predetermined APP is activated, and keep the mobile communication device in the RRC connected mode associated with the second subscriber identity while providing the PS data service for the predetermined APP using the first subscriber identity.

In another aspect of the application, a method for coordinating operations associated with multiple subscriber identities, executed by a controller of a mobile communication device which comprises an RF device, is provided. The method comprises the steps of: activating a predetermine APP; providing a PS data service for the predetermined APP using a first subscriber identity via the RF device; establishing an RRC connection using a second subscriber identity via the RF device to enable the mobile communication device to enter an RRC connected mode after the predetermined APP is activated; and keeping the mobile communication device in the RRC connected mode associated with the second subscriber identity while providing the PS data service for the predetermined APP using the first subscriber identity.

Other aspects and features of the present application will become apparent to those with ordinarily skill in the art upon review of the following descriptions of specific embodiments of the mobile communication devices and the methods for coordinating operations associated with multiple subscriber identities.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
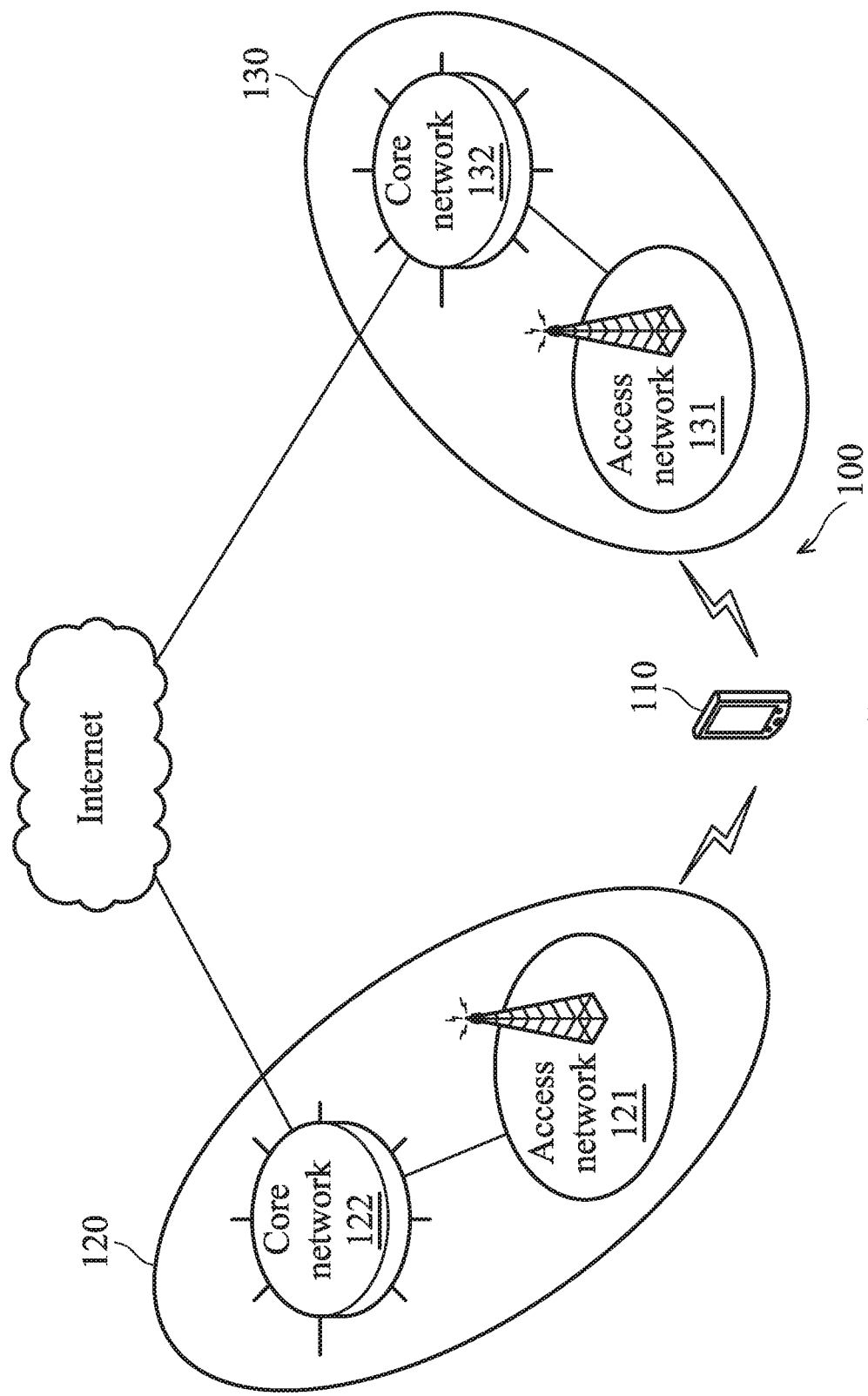
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a mobile communication device 110 and two service networks 120 and 130.

The mobile communication device 110 may be referred to as a User Equipment (UE) or Mobile Station (MS), such as a feature phone, a smartphone, a tablet, a laptop computer, or any computing device supporting the RATs utilized by the service networks 120 and 130.

The mobile communication device 110 may wirelessly communicate with both the service networks 120 and 130 using two separate subscriber identities (or referred to as subscriber numbers).

The subscriber identities may be provided by one or two subscriber identity cards (not shown) in compliance with the specifications of the RAT utilized by the service networks 120 and 130. For example, the subscriber identity cards may include a Subscriber Identity Module (SIM) card if one of the service networks 120 and 130 is a GSM/GPRS/EDGE/IS-95 network, or may include a Universal SIM (USIM) card if one of the service networks 120 and 130 is a WCDMA/LTE/LTE-A/TD-LTE/NR network.

Alternatively, the subscriber identities may be directly written into the mobile communication device 110, without the need for any socket to insert any subscriber identity card, or the subscriber identities may be provided by one or more virtual subscriber identity cards (e.g., eSIM/eUSIM), and the present application is not limited thereto.

The service network 120 may be any service network capable of providing Packet-Switched (PS) data services, while the service network 130 may be any service network supporting CS Fallback (CSFB), i.e., any service network capable of enabling the mobile communication device 110 to fall back to another service network for CS call services.

For example, the service network 120 may be a 5G network (e.g., an NR network), a 4G network (e.g., an LTE/LTE-A/TD-LTE network), or a 3G network (e.g., a WCDMA/CDMA-2000/TD-SCDMA network), and the service network 130 may be a 4G network (e.g., an LTE/LTE-A/TD-LTE network). It should be noted that the service network 130 may be a 5G network if the future enhancement of the 5G network supports CSFB, or the service network 130 may be a 6G network as long as the 6G network supports CSFB.

Specifically, the service network 120 includes an access network 121 and a core network 122, while the service network 130 includes an access network 131 and a core network 132. The access networks 121 and 131 are responsible for processing radio signals, terminating radio protocols, and connecting the mobile communication device 110 with the core networks 122 and 132, respectively. The core networks 122 and 132 are responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 is a WCDMA network, the access network 121 may be a Universal Terrestrial Radio Access Network (UTRAN) and the core network 122 may be a GPRS core which includes a Home Location Register (HLR), at least one Serving GPRS Support Node (SGSN), and at least one Gateway GPRS Support Node (GGSN).

If the service network 120 or 130 is an LTE/LTE-A/TD-LTE network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 120 is an NR network, the access network 121 may be a Next Generation Radio Access Network (NG-RAN) which includes at least a gNB or Transmission Reception Point (TRP), and the core network 122 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session.

The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be understood that the description of the wireless communication environment 100 is for illustrative purposes only and is not intended to limit the scope of the application.

Figure 2:
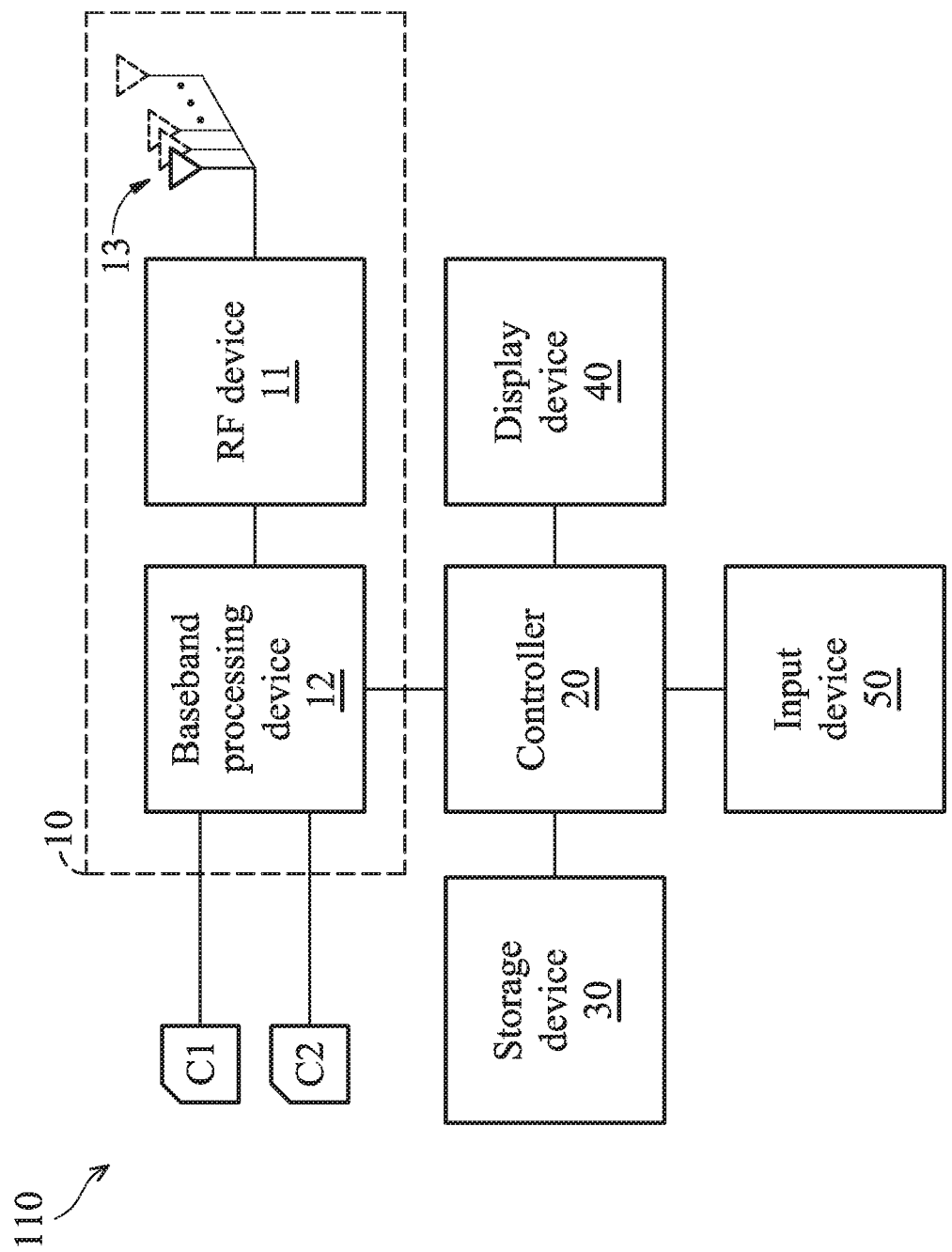
FIG. 2 is a block diagram illustrating the mobile communication device 110 according to an embodiment of the application.

FIG. 2 is a block diagram illustrating the mobile communication device 110 according to an embodiment of the application.

As shown in FIG. 2, the mobile communication device 110 includes a wireless transceiver 10, a controller 20, a storage device 30, a display device 40, and an Input/Output (I/O) device 50.

The wireless transceiver 10 is configured to perform wireless transmission and reception to and from the cells formed by the service networks 120 and 130 using two subscriber identity cards (denoted as C1 and C2 in FIG. 2), wherein one subscriber identity card may be preconfigured as a data (U)SIM card which is dedicated for data services (e.g., PS data service), while the other subscriber identity card may be preconfigured as a non-data (U)SIM card which is dedicated for non-data services (e.g., call service).

Specifically, the wireless transceiver 10 includes an RF device 11, a baseband processing device 12, and antenna 13, wherein the antenna 13 may include an antenna array for beamforming.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may contain multiple hardware devices to perform radio frequency conversion. For example, the RF device 11 may comprise a mixer to multiply the baseband signals with a carrier oscillated in the radio frequency of the supported cellular technologies, wherein the radio frequency may be 900 MHz, 1900 MHz or 2100 MHz utilized in WCDMA systems, or may be 850 MHz, 1900 MHz, or 2100 MHz utilized in IS-95/CDMA-2000/CDMA-2000 1× EV-DO technology, or may be 900 MHz, 2100 MHz, or 2.6 GHz utilized in LTE/LTE-A/TD-LTE technology, or any radio frequency (e.g., 30 GHz-300 GHz for mmWave) utilized in 5G (e.g., NR) systems, or another radio frequency, depending on the RAT in use.

The baseband processing device 12 is configured to perform baseband signal processing and control the communications between the subscriber identity cards C1 and C2 and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

In one embodiment, a dual-card controller (not shown) may be coupled between the baseband processing device 12 and the subscriber identity cards C1 and C2 for powering the subscriber identity cards C1 and C2 with the same or different voltage levels according to the requirements thereof by a Power Management Integrated Chip (PMIC) and a battery, wherein the voltage level for each subscriber identity card is determined during initiation. The baseband processing device 12 may read data from one of the subscriber identity cards C1 and C2, and writes data to one of the subscriber identity cards C1 and C2 via the dual-card controller. In addition, the dual-card controller selectively transfers clocks, resets, and/or data signals to the subscriber identity cards C1 and C2 according to instructions issued by the baseband processing device 12.

In another embodiment, the baseband processing device 12 may include two interfaces (not shown) which independently handle the connections to the subscriber identity cards C1 and C2. It should be understood that the hardware architecture shown in FIG. 2 may be modified to include more than two subscriber identity cards or include only one subscriber identity card, and the application should not be limited thereto.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the function of data processing and computing, controlling the wireless transceiver 10 for coordinating the communication operations associated with two separate subscriber identities, storing and retrieving data to and from the storage device 30, sending a series of frame data (e.g. representing text messages, graphics, images, etc.) to the display device 40, and receiving/outputting signals from/to the I/O device 50.

Particular, the controller 20 is responsible for coordinating the aforementioned operations of the wireless transceiver 10, the storage device 30, the display device 40, and the I/O device 50 to perform the method of the present application.

In another embodiment, the controller 20 may be incorporated into the baseband processing device 12, serving as a baseband processor.

As will be appreciated by persons skilled in the art, the circuits of the controller 20 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of operating system(s), applications, communication protocols, and/or the method of the present application.

The display device 40 may be a Liquid-Crystal Display (LCD), Light-Emitting Diode (LED) display, Organic LED (OLED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application. For example, the mobile communication device 110 may further include a Wireless-Fidelity (Wi-Fi) device for providing a short-range wireless communication function, a Global Positioning System (GPS) device for use of some location-based services or applications, and/or power, etc. Alternatively, the mobile communication device 110 may include fewer components. For example, the mobile communication device 110 may not include the display device 40 and/or the I/O device 50.

Figure 3:
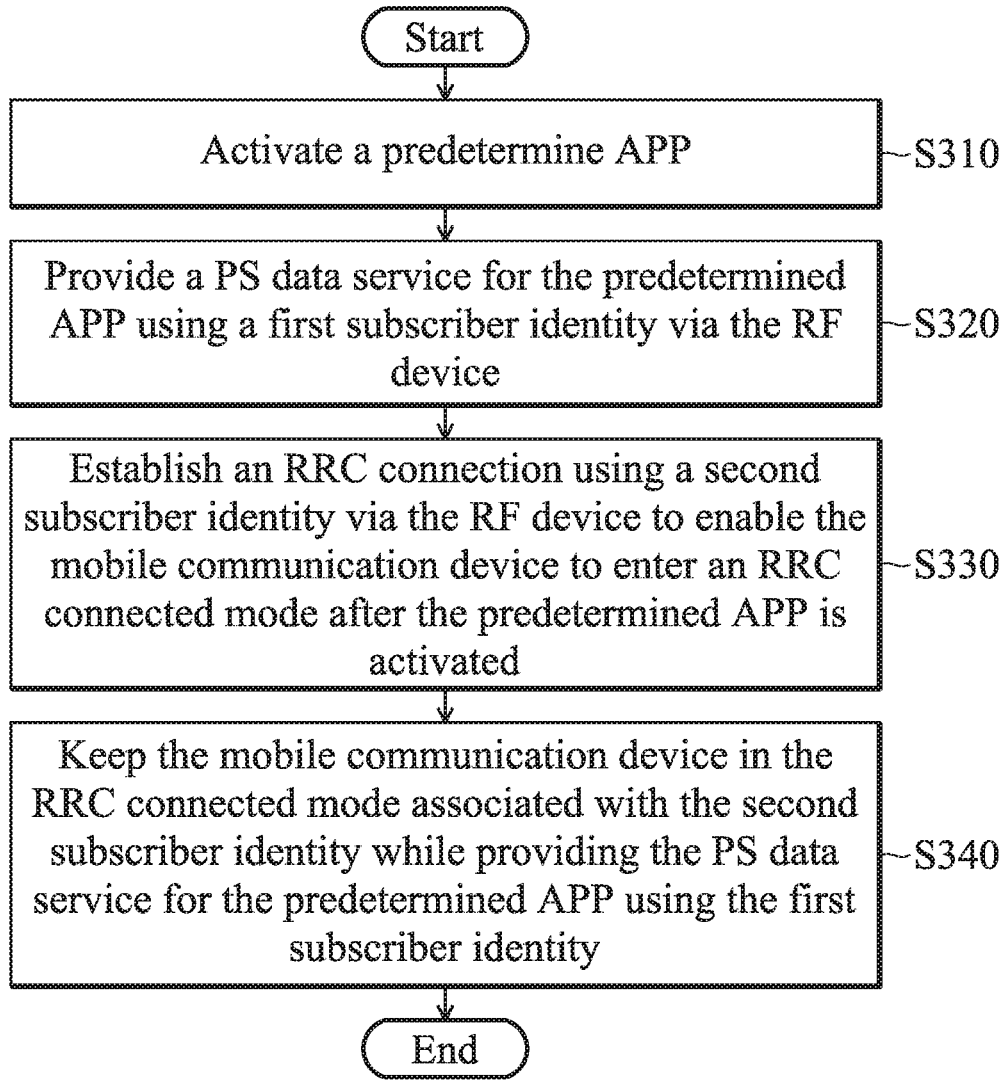
FIG. 3 is a flow chart illustrating the method for coordinating operations associated with multiple subscriber identities according to an embodiment of the application.

FIG. 3 is a flow chart illustrating the method for coordinating operations associated with multiple subscriber identities according to an embodiment of the application.

In this embodiment, the method for coordinating operations associated with multiple subscriber identities may be applied to a mobile communication device equipped with a single RF device and a controller (e.g., a baseband processor), and may be executed by the controller.

To begin with, the controller activates a predetermined Application (APP) (step S310).

Subsequent to step S310, the controller provides a PS data service for the predetermined APP using a first subscriber identity via the RF device (step S320).

Subsequent to step S320, the controller establishes a Radio Resource Control (RRC) connection using a second subscriber identity via the RF device to enable the mobile communication device to enter an RRC connected mode after the predetermined APP is activated (step S330).

Subsequent to step S330, the controller keeps the mobile communication device in the RRC connected mode associated with the second subscriber identity while providing the PS data service for the predetermined APP using the first subscriber identity (step S340), and the method ends.

To further clarify, during the provision of the PS data service for the predetermined APP using the first subscriber identity, the controller may receive a notification of an incoming Circuit-Switched (CS) Mobile Terminated (MT) call for the second subscriber identity via the RF device. It should be noted that, according to 3GPP spec, in the RRC idle mode, the mobile communication device is notified of an incoming call through a paging, and a CSFB procedure has to be performed for the second subscriber identity in response to receiving the paging; in the RRC connected mode, the mobile communication device is notified of an incoming call through a CS SERVICE NOTIFICATION message, and the mobile communication can decide whether to perform the CSFB procedure in response to receiving the CS SERVICE NOTIFICATION message.

In the conventional designs, since the communication state of the second subscriber identity (e.g., provided by a non-data (U)SIM card) is not always in the RRC connected mode, if there is an incoming CS MT call for the second subscriber identity when the communication state of the second subscriber identity is in the RRC idle mode, the mobile communication device will be notified of the incoming CS MT call for the second subscriber identity through a paging and the CSFB procedure will be performed. When the CSFB procedure is performed, the RF device will be allocated to the second subscriber identity and the PS data service associated with the first subscriber identity (e.g., provided by a data (U)SIM card) will inevitably be interrupted.

By contrast, in the present application, the communication state of the second subscriber identity (e.g., provided by a non-data (U)SIM card) is kept in the RRC connected mode, so the mobile communication device will be notified of an incoming CS MT call for the second subscriber identity through a CS SERVICE NOTIFICATION message. Since the CSFB procedure will not be performed automatically in response to receiving the CS SERVICE NOTIFICATION message, the RF device will not be allocated to the second subscriber identity and the PS data service associated with the first subscriber identity (e.g., provided by a data (U)SIM card) may continue until the user of the mobile communication device decides to accept the call, thereby providing a better user experience.

In one embodiment, the controller may send one or more control Protocol Data Units (PDUs) (e.g., Packet Data Convergence Protocol (PDCP) control PDUs) on the RRC connection, to keep the mobile communication device in the RRC connected mode associated with the second subscriber identity while providing the PS data service for the predetermined APP using the first subscriber identity. For example, the controller may periodically send a control PDU on the RRC connection to keep the mobile communication device in the RRC connected mode associated with the second subscriber identity. Please note that sending the control PDUs to keep the mobile communication device in the RRC connected mode can avoid incurring any telecom charges to the user. In addition, among all kinds of control PDUs, PDCP control PDUs may be preferred in some embodiments due to that sending PDCP control PDUs may have a better chance of keeping the mobile communication device in the RRC connected mode than the other kinds of control PDUs.

In one embodiment, the predetermined APP may be an APP which the user prefers to enjoy without any interruption, such as a gaming APP or an APP in a whitelist for a gamming mode of the mobile communication device. When any of the APPs in the whitelist is activated, the mobile communication device may be enabled to enter the gaming mode in which the activated APP may run in the foreground and may be allocated with more hardware resources (e.g., computing power of the controller 20 and/or storage space of the storage device 30) and/or may be kept uninterrupted from any unwanted notifications.

In one embodiment, after receiving the notification of the incoming CS MT call for the second subscriber identity, the controller keeps the mobile communication device in the RRC connected mode associated with the second subscriber identity while providing the PS data service for the predetermined APP using the first subscriber identity, and may inform the application layer of the incoming CS MT call for the second subscriber identity, and through the application layer, the user may decide whether to accept or reject the incoming CS MT call for the second subscriber identity. If the user input indicating to reject the incoming CS MT call for the second subscriber identity is received, the controller keeps the mobile communication device in the RRC connected mode associated with the second subscriber identity while providing the PS data service for the predetermined APP using the first subscriber identity. Otherwise, if the user input indicating to accept the incoming CS MT call for the second subscriber identity is received, the controller establishes a voice call for the second subscriber identity via the RF device using a 2G RAT or a 3G RAT (i.e., the PS data service associated with the first subscriber identity may be interrupted/suspended/stopped due to the access to the RF device is allocated to the voice call establishment for the second subscriber identity).

Specifically, the application layer is responsible for user interaction with the mobile communication device, and the application layer may include various APPs, such as web browser APP(s), gaming APP(s), and call center APP, etc.

For example, the controller may refer to the baseband processor of the mobile communication device, and it may inform the call center APP in the application layer about the incoming CS MT call for the second subscriber identity. There may be intermediate layers between the hardware (e.g., the controller) and the application layer, such as the kernel space of an operating system (e.g., Android), the user space of the operating system, and the application framework layer. The information of the incoming CS MT call may be communicated from the controller to the application layer through these intermediate layers, wherein each intermediate layer may include a respective interface or driver which is responsible for forwarding the information of the incoming CS MT call.

Figure 4:
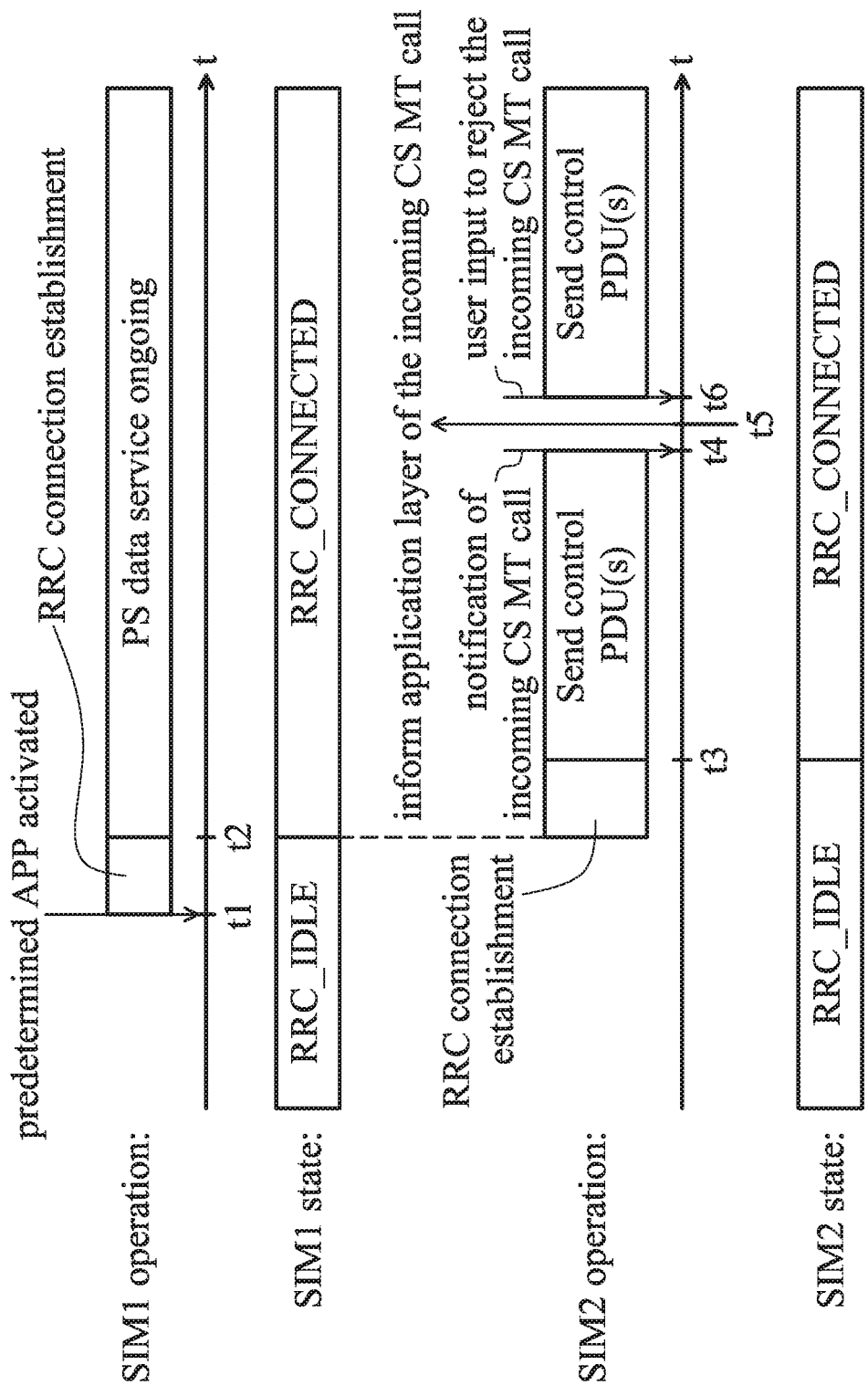
FIG. 4 is schematic diagram illustrating the communication operations and states associated with two separate subscriber identities according to an embodiment of the application.

FIG. 4 is schematic diagram illustrating the communication operations and states associated with two separate subscriber identities according to an embodiment of the application.

As shown in FIG. 4, the communication states of SIM1 and SIM2 are both initially in the idle mode.

At time t1, a predetermined APP is activated, after that, SIM1 is used to establish an RRC connection to provide a PS data service for the predetermined APP.

At time t2, the RRC establishment procedure for SIM1 is completed and the communication state of SIM1 is switched from the RRC idle mode. And since then, the PS data service is ongoing.

After the predetermined APP is activated, for example at time t2, SIM2 is used to establish an RRC connection.

At time t3, the RRC establishment procedure for SIM2 is completed and the communication state of SIM2 is switched from the RRC idle mode to the RRC connected mode. And since then, one or more control PDUs (e.g., PDCP control PDUs) are sent to keep the mobile communication device in the RRC connected mode associated with SIM2 while providing the PS data service associated with SIM1.

At time t4, a notification of an incoming CS MT call for SIM2 is received. Please note that, since the mobile communication device is kept in the RRC connected mode associated with SIM2 when receiving the notification of an incoming CS MT call for SIM2, the PS data service associated with SIM1 can remain ongoing without being interrupted by the incoming CS MT call for SIM2.

At time t5, the application layer is informed of the incoming CS MT call.

At time t6, a user input to reject the incoming CS MT call is received from the application layer. In this embodiment, the PS data service associated with SIM1 may remain ongoing during the time period from t4 to t6.

In another embodiment, if the user decides to accept the call, the PS data service associated with SIM1 will be suspended/stopped at time t6 to concede the access to the RF device, so that the CSFB procedure associated with SIM2 may be performed using the RF device to establish the call for SIM2. Even so, the PS data service associated with SIM1 may remain ongoing during the time period from t4 to t6, and this is an advantage that the conventional design cannot achieve.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A mobile communication device, comprising:
   a Radio Frequency (RF) device; and
   a controller, configured to:
   provide a Packet-Switched (PS) data service using a first subscriber identity via the RF device;
   establish a Radio Resource Control (RRC) connection using a second subscriber identity via the RF device to enable the mobile communication device to enter an RRC connected mode associated with the second subscriber identity; and
   maintain the RRC connection, in contrast to a Packet Data Network (PDN) connection, associated with the second subscriber identity via the RF device, by periodically sending a control Protocol Data Unit (PDU) on the RRC connection to keep the mobile communication device in the RRC connected mode associated with the second subscriber identity as long as the PS data service associated with the first subscriber identity is ongoing,
   wherein the controller is further configured to receive a notification of an incoming Circuit-Switched (CS) Mobile Terminated (MT) call for the second subscriber identity via the RF device, and after receiving the notification of the incoming CS MT call for the second subscriber identity, keep the mobile communication device in the RRC connected mode associated with the second subscriber identity while providing the PS data service using the first subscriber identity to avoid a CS Fallback (CSFB) procedure being performed.

2. The mobile communication device of claim 1, wherein the control PDU is a Packet Data Convergence Protocol (PDCP) control PDU.

3. The mobile communication device of claim 1, wherein the PS data service is provided for a predetermined Application (APP), and the establishing of the RRC connection using the second subscriber identity via the RF device is performed based on the predetermined APP being in a whitelist for a gamming mode of the mobile communication device.

4. The mobile communication device of claim 3, wherein the predetermined APP is a gaming APP.

5. The mobile communication device of claim 1, wherein the controller is further configured to receive a user input to reject the incoming CS MT call for the second subscriber identity, and after rejecting the incoming CS MT call for the second subscriber identity, keep the mobile communication device in the RRC connected mode associated with the second subscriber identity while providing the PS data service using the first subscriber identity.

6. The mobile communication device of claim 1, wherein the controller is further configured to receive a user input to accept the incoming CS MT call for the second subscriber identity, and establish a voice call for the second subscriber identity via the RF device using a second generation (2G) Radio Access Technology (RAT) or a third generation (3G) RAT.

7. The mobile communication device of claim 6, wherein the RRC connection is established using a fourth generation (4G) RAT.

8. A method for coordinating operations associated with multiple subscriber identities, executed by a controller of a mobile communication device which comprises a Radio Frequency (RF) device, the method comprising:

providing a Packet-Switched (PS) data service using a first subscriber identity via the RF device;

establishing a Radio Resource Control (RRC) connection using a second subscriber identity via the RF device to enable the mobile communication device to enter an RRC connected mode associated with the second subscriber identity;

maintaining the RRC connection, in contrast to a Packet Data Network (PDN) connection, using the second subscriber identity via the RF device, by periodically sending a control Protocol Data Unit (PDU) on the RRC connection to keep the mobile communication device in the RRC connected mode associated with the second subscriber identity as long as the PS data service associated with the first subscriber identity is ongoing;

receiving a notification of an incoming Circuit-Switched (CS) Mobile Terminated (MT) call for the second subscriber identity via the RF device; and after receiving the notification of the incoming CS MT call for the second subscriber identity, keeping the mobile communication device in the RRC connected mode associated with the second subscriber identity while providing the PS data service using the first subscriber identity.

9. The method of claim 8, wherein the control PDU is a Packet Data Convergence Protocol (PDCP) control PDU.

10. The method of claim 8, wherein the PS data service is provided for a predetermined Application (APP), and the establishing of the RRC connection using the second subscriber identity via the RF device is performed based on the predetermined APP being in a whitelist for a gamming mode of the mobile communication device.

11. The method of claim 10, wherein the predetermined APP is a gaming APP.

12. The method of claim 10, further comprising:
receiving a user input to reject the incoming CS MT call for the second subscriber identity; and
after rejecting the incoming CS MT call for the second subscriber identity, keeping the mobile communication device in the RRC connected mode associated with the second subscriber identity while providing the PS data service using the first subscriber identity.

13. The method of claim 10, further comprising:
receiving a user input to accept the incoming CS MT call for the second subscriber identity; and
establishing a voice call for the second subscriber identity via the RF device using a second generation (2G) Radio Access Technology (RAT) or a third generation (3G) RAT.

14. The method of claim 13, wherein the RRC connection is established using a fourth generation (4G) RAT.

* * * * *